Feb. 23, 1926.  1,573,964
J. A. JOHNSON
TESTING APPARATUS
Filed Dec. 12, 1924   2 Sheets-Sheet 1
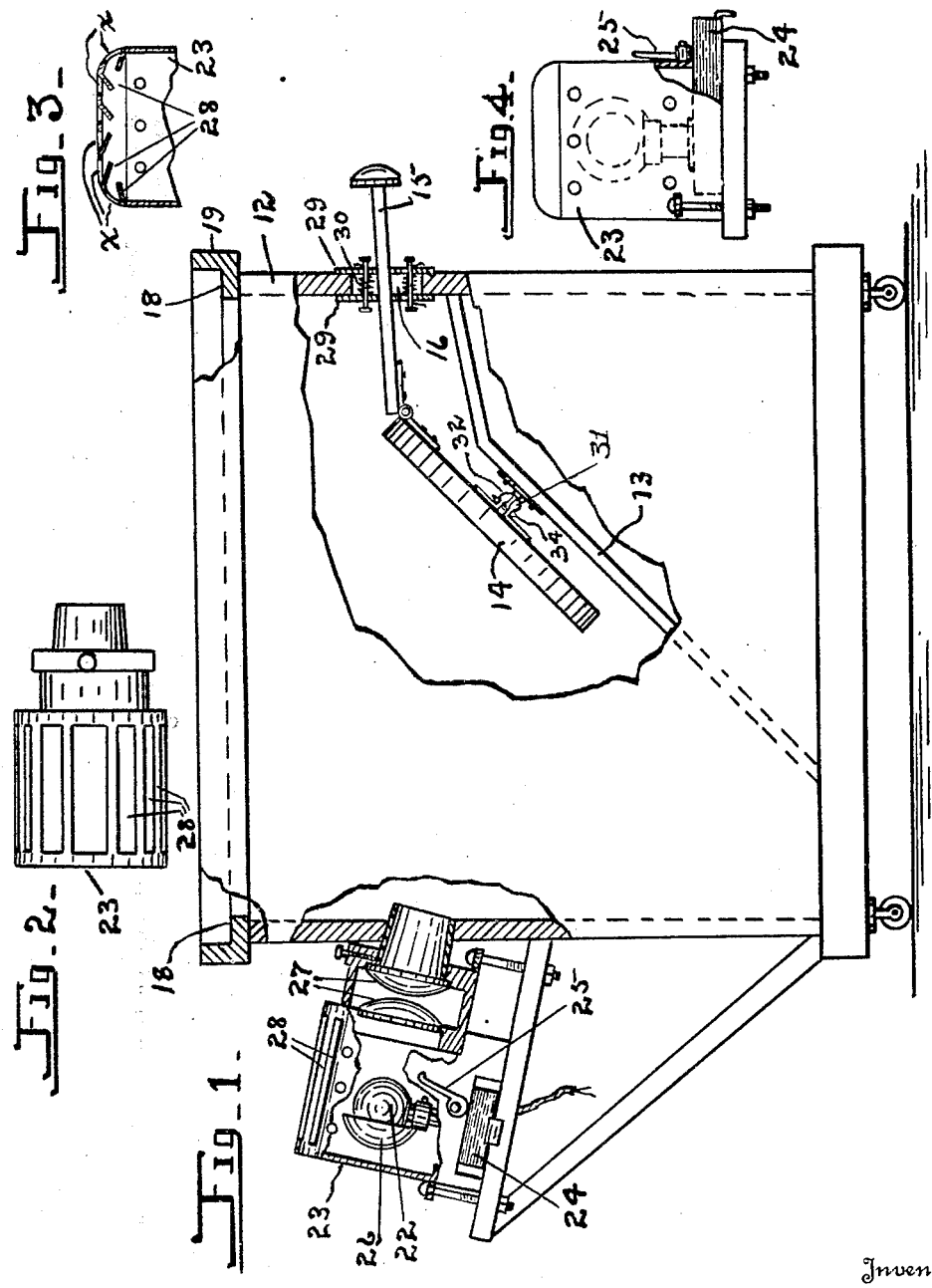
Inventor
John A. Johnson
By Hiram A. Sturges
Attorney Feb. 23, 1926.
J. A. JOHNSON
TESTING APPARATUS
Filed Dec. 12, 1924
1,573,964
2 Sheets-Sheet 2
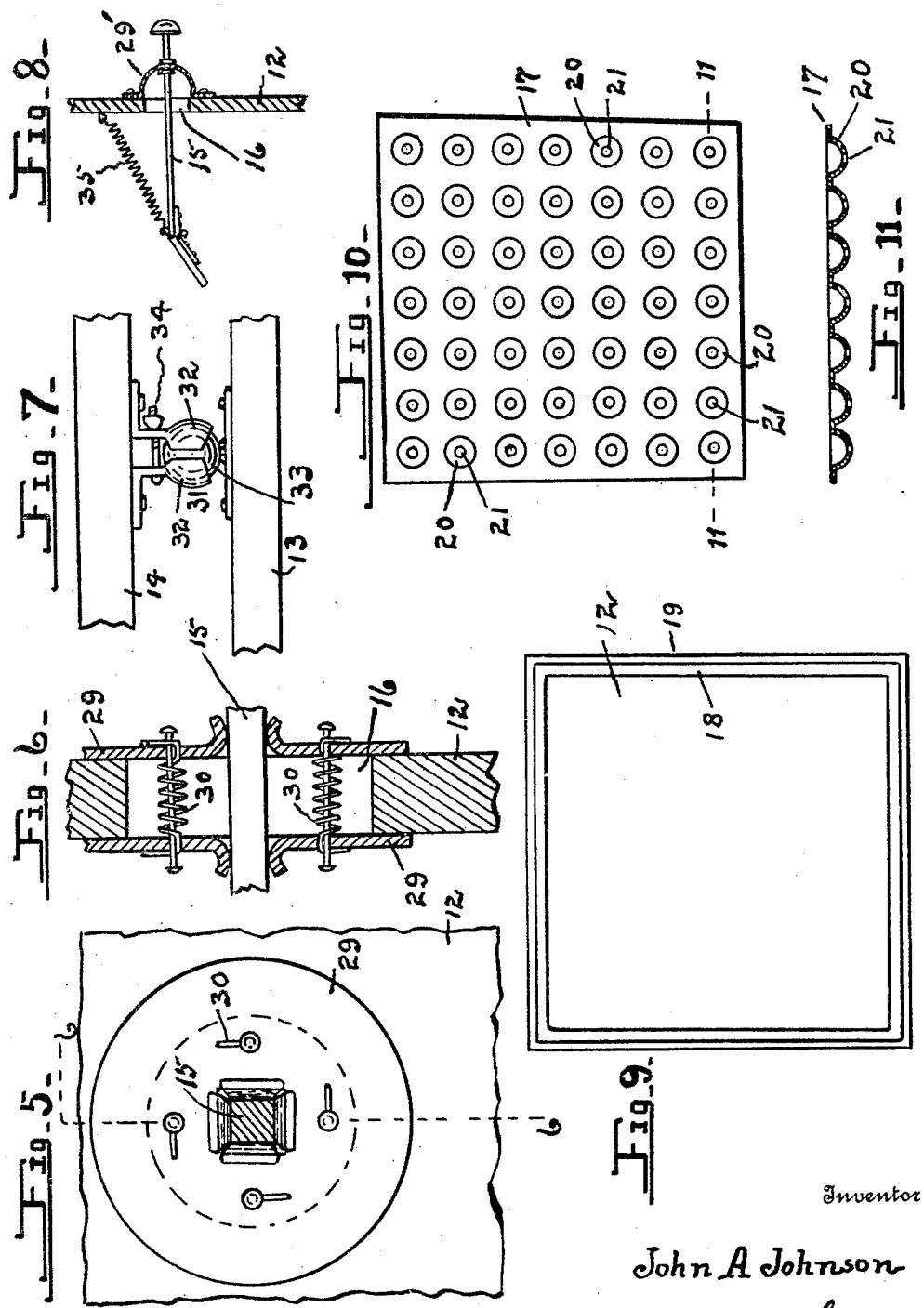
Inventor
John A Johnson
By
Hiram A Sturges
Attorney Patented Feb. 23, 1926.

UNITED STATES PATENT OFFICE.

JOHN A. JOHNSON, OF COLLEGE SPRINGS, IOWA.

TESTING APPARATUS.

Application filed December 12, 1924. Serial No. 755,418.

*To all whom it may concern:*

Be it known that I, JOHN A. JOHNSON, a citizen of the United States, residing at College Springs, in the county of Page and State of Iowa, have invented certain new and useful Improvements in a Testing Apparatus, of which the following is a specification.

This invention has for its principal object to provide an apparatus which will be convenient and effective in use for testing or for the inspection, comparison or study of transparent, semi-transparent or translucent bodies, objects or substances.

The invention includes a casing and a screen or holder-plate which may provide a wall for the casing or may be removable therefrom, said screen being opaque, transparent or semi-transparent, translucent or apertured; also it includes a lamp-support which may be stationary or adjustable; also it includes a suitable mirror or reflector so that rays of light may be directed by an operator to any part of the screen or holder-plate, suitable lenses being provided between the lamp and mirror, and the lenses and mirror to be of any suitable form.

With the foregoing objects in view the invention presents a new and useful construction, combination and arrangement of parts, as described herein and claimed, and as illustrated in the accompanying drawings, wherein,—

Fig. 1 is a broken away view in side elevation of the apparatus, parts being in section. Fig. 2 is a plan view of a lamp receptacle and Fig. 3 is a broken away, sectional view of the same, being a detail to show baffle-plates. Fig. 4 is an end view, partly in section, of the lamp receptacle. Fig. 5 is a detail to clearly show a supporting-plate for a control bar. Fig. 6 is a section on line 6—6 of Fig. 5. Fig. 7 is a side view of an adjustable joint for the mirror or reflector. Fig. 8 is a sectional view, being a detail to show a modified form for supporting the control bar shown in Figs. 5 and 6. Fig. 9 is a plan view of a casing for the apparatus. Fig. 10 is a plan view of a screen or apertured holder for objects or substances to be tested or inspected. Fig. 11 is a sectional view on line 11—11 of Fig. 10.

Referring now to the drawing, numeral 12 indicates a casing provided with a support or inclined partition 13. Numeral 14 indicates a mirror or reflector to which is pivotally attached an operating-bar or handle 15 which projects outwardly of the casing through an aperture 16, and since the reflector or mirror 14 has a universal joint connection with the support 13, an operator, by use of the handle or bar 15, may cause swinging movements forwardly or rearwardly or transversely of the casing to cause rays of light to be reflected upwardly to or through the open top of the casing and to any part of the area of said opening.

While the apparatus may be used for testing or inspecting various objects, bodies or substances, it is particularly well adapted for use in the examination and testing of eggs, said eggs being disposed upon a screen or apertured holder 17; and for this purpose the screen or holder may be supported upon the ledges 18 of the cap or collar 19 which is disposed at the open top of the casing. The screen 17 in the present instance is provided with depressions 20 for receiving the eggs (not shown), the wall of each depression, at its middle, being provided with an aperture 21, and by manual use of the bar 15, rays of light may be directed from the element 14 to each aperture 21 so that an operator viewing the eggs while looking downwardly, may examine or test the eggs to great advantage.

In order that adjustments may be made for a lamp 22 in the receptacle 23, it is secured to a support 24 which may be manually moved, and after an adjustment has been made, the support may be secured in stationary relation with the receptacle by any suitable means, the means herein shown being a fastener-bar 25 eccentrically mounted upon the receptacle and adapted to have a swinging movement for pressing the support or slide-plate 24 against the bottom of the receptacle. The lamp may be of any preferred kind and in the present instance is provided with a hood or reflector 26. Numeral 27 indicates suitably mounted lenses, and it will be understood that rays of light will be directed from the illuminating element 22 through the lenses to the mirror or reflector to be again directed to any part of the screen under control of the handle or operating-bar 15.

Numerals 28 indicate baffle-plates which are provided for the top of the receptacle 23 to permit ventilation through slots *a* formed on said top, and tending to deflect the rays of light which otherwise might be directed to the upper part or above the casing from the lamp, it being obvious that light directed upwardly from the lamp receptacle might interfere with the work of an operator while looking downwardly upon the screen or holder-plate 17. While it is true that baffle-plates would not be needed for an illumination receptacle disposed remote from the open top of the casing 12, they are useful in the present instance for the reason that, in order to direct the rays of light to or through the screen 17 in a manner convenient for operation and inspection, the lamp receptacle should be disposed in approximately the position shown in Fig. 1 of the drawings.

It will be appreciated that while the mirror 14 may have the several swinging movements mentioned during operation, it should remain stationary, at intervals, to permit inspections, and any suitable means may be provided for the mounting, between its ends of the bar 15 which will permit it to be moved in any desired direction in the aperture 16 of the casing, said means also tending to maintain the bar 15 and the mirror in stationary positions after these parts have been moved, the means for this purpose, shown in Figs. 1, 5 and 6, consisting of a pair of side-plates 29 normally pressed toward each other and against the opposed sides of a wall of the casing 12, adjacent to the aperture 16, by means of springs 30, said plates 29 having rugose terminals which frictionally engage the bar 15, and this mounting for said bar operates to advantage; and when an operator, by manual control of the bar, disposes the mirror in a desired position the mirror and said bar will remain stationary on account of the resiliency of the springs, aided by the adjustable joint 31 employed for a mounting of the mirror upon the support 13, this particular mounting consisting of a pair of curved wings 32 (Figs. 1, 7,) which are secured to the lower part of the mirror and which provide a socket for receiving a ball 33 which is secured to the support 13, a keeper or set-screw 34 being employed for pressing the wings 32 toward each other against the ball 33, and it is obvious that the adjustment may be such that the mirror will remain in a stationary position after it has been moved by the bar 15; and in operation the bar is used as often as necessary for changing the inclination of the mirror so that the rays of light will be directed to the several depressions of the holder-plate or screen so that each body, object or substance on said holder-plate or screen may be inspected, studied, compared or tested in succession.

In the modification shown in Fig. 8 of the drawings, numeral 29' indicates a flexible, normally curved web or cap traversed by the bar 15 and secured to the wall of the casing, said cap permitting said bar to be moved manually in any required direction under control of a spring 35, and this control for said bar may be used if desired.

While I have shown and described a specific construction for this apparatus it has been for the purpose of illustrating and explaining one embodiment of the invention, also to prove utility, and it will be understood that I may change minor details of construction, and the form, size, and proportion of parts may be changed as found to be of advantage, said changes being determined by the scope of the invention as claimed.

I claim as my invention:—

1. In a testing apparatus, a casing, a pivotally mounted mirror in the casing, a screen for supporting objects to be tested, an illuminant for directing rays of light to the mirror to be reflected to the screen, an operating-bar connected with the mirror and traversing a wall of the casing, and yielding means on the casing engaging the operating-bar to permit longitudinal reciprocation and transverse movements of said bar for moving the mirror.

2. In a testing apparatus, a casing having an open top with inwardly projecting ledges, a screen removably seated on the ledges for supporting objects to be tested, a mirror disposed below the screen, an illuminant for directing rays of light to the mirror, an operating-bar hingeably connected with the mirror and traversing a side of the casing, and movable supporting means on the casing in engagement with the operating-bar to permit said bar to be rotated and to be longitudinally reciprocated for moving said mirror.

3. In a testing apparatus, an upright casing having a horizontal top provided with an opening, a screen adapted to be removably disposed in said opening for supporting an object to be tested, a pivotally mounted mirror in the casing, an illuminant for directing rays of light to the mirror, and an operating-bar hingeably connected with the mirror and having a mounting on the casing to permit longitudinal and transverse movements of the bar for moving said mirror.

4. In a testing apparatus, a casing open at its top, a screen in said opening, a pivotally mounted mirror in the casing, an illuminating element for directing rays of light to the mirror, an operating-bar hingeably connected with the mirror and extending outwardly of the casing for inclining the mirror forwardly, rearwardly or transversely of the casing, said screen having concaved depressions opening on its top for supporting objects to be tested and for excluding rays of light therefrom and having apertures in the depressions for admitting rays of light to said objects.

5. In a testing apparatus, a casing open at its top, a screen removably disposed in said open top and having apertured depressions, a pivotally mounted mirror in the casing, an illuminant for directing rays of light to the mirror to be reflected to said apertured depressions, and a revoluble, longitudinally movable operating-bar hingeably connected with the mirror and projecting outwardly of the casing.

6. In a testing apparatus, a casing having an apertured side wall and an opening in its top and provided with ledges at said opening, a screen removably disposed in said opening upon said ledges and having numerous concaved, apertured depressions for supporting objects to be tested, a reflector element having a universal joint mounting in the casing, a lamp for directing rays of light to the reflector element to be reflected to the apertures of said depressions, an operating-bar in the aperture of said side wall hingeably connected with said reflector element and adapted to be reciprocated longitudinally and to be moved transversely for adjusting the reflector element, and resilient means normally tending to control the movements of the operating-bar.

In testimony whereof, I have affixed my signature.

JOHN A. JOHNSON.